(12) United States Patent
Zhu et al.

(10) Patent No.: US 11,824,348 B1
(45) Date of Patent: Nov. 21, 2023

(54) PT FERROMAGNETIC RESONANCE ELIMINATION METHOD IMPLEMENTED BY ACTIVELY INPUTTING RESISTANCE THROUGH ELECTRONIC LOAD

(71) Applicant: QUJING POWER SUPPLY BUREAU OF YUNNAN POWER GRID CO., LTD, Qujing (CN)

(72) Inventors: Xiaohong Zhu, Qujing (CN); Yin Yang, Qujing (CN); Sirao Lu, Qujing (CN); Yuan Shan, Qujing (CN); Juntao Zeng, Qujing (CN); Weirong Yang, Qujing (CN); Zhe Li, Qujing (CN); Yu Gong, Qujing (CN); Wenfei Feng, Qujing (CN); Shoudong Xu, Qujing (CN); Yongsheng Ning, Qujing (CN); Rong Zhang, Qujing (CN); Qibin Mei, Qujing (CN); Lianjing Yang, Qujing (CN); Dekai Chen, Qujing (CN)

(73) Assignee: QUJING POWER SUPPLY BUREAU OF YUNNAN POWER GRID CO., LTD, Qujing (CN)

( * ) Notice: Subject to any disclaimer, the term of this patent is extended or adjusted under 35 U.S.C. 154(b) by 0 days.

(21) Appl. No.: 18/201,919

(22) Filed: May 25, 2023

(30) Foreign Application Priority Data

Sep. 1, 2022 (CN) .......... 202211063920.9

(51) Int. Cl.
*H02H 9/00* (2006.01)
*H02H 1/00* (2006.01)
*H02H 7/05* (2006.01)

(52) U.S. Cl.
CPC .......... *H02H 9/007* (2013.01); *H02H 1/0092* (2013.01); *H02H 7/05* (2013.01)

(58) Field of Classification Search
CPC .......... H02H 9/007; H02H 1/0092; H02H 7/05
See application file for complete search history.

(56) References Cited

U.S. PATENT DOCUMENTS 11,264,793 B2 * 3/2022 Wang ............... H02H 7/04
2020/0287379 A1 9/2020 Wang et al.

FOREIGN PATENT DOCUMENTS

CN 105931823 A 9/2016
CN 108987073 A 12/2018
(Continued)

*Primary Examiner* — Scott Bauer
(74) *Attorney, Agent, or Firm* — Daniel M. Cohn; Howard M. Cohn

(57) ABSTRACT

The present disclosure relates to the technical field of potential transformer (PT) ferromagnetic resonance elimination, in particular to a PT ferromagnetic resonance elimination method implemented by actively inputting resistance through an electronic load, including the following steps: setting up a PT, and determining a mapping relationship; constructing a resonance elimination control system; and designing the electronic load as an active resonance elimination device. The present disclosure overcomes a contradiction between a magnitude of resonance elimination resistance and winding overload in a PT open delta during single-phase-to-earth fault and fault clearance, and effectively avoids the technical problems of difficult distinguishing between single-phase-to-earth fault characteristics and power frequency resonance characteristics and causing resonance in a single-phase-to-earth fault process. Compared with previous disclosure designs, the present disclosure directly measures parameters, and is simple in algorithm, low in computational complexity, rapid in arithmetic speed, high in precision and less in error.

6 Claims, 12 Drawing Sheets

(56) References Cited

FOREIGN PATENT DOCUMENTS

| | | | |
|---|---|---|---|
| CN | 110445109 A | | 11/2019 |
| CN | 209748176 U | | 12/2019 |
| JP | 10243549 A | * | 9/1998 |
| JP | 11004578 A | * | 1/1999 |
| JP | 2008053334 A | * | 3/2008 |
| JP | 2020156249 A | | 9/2020 |
| JP | 2020156271 A | * | 9/2020 |

* cited by examiner

PT FERROMAGNETIC RESONANCE ELIMINATION METHOD IMPLEMENTED BY ACTIVELY INPUTTING RESISTANCE THROUGH ELECTRONIC LOAD

TECHNICAL FIELD

The present disclosure relates to the technical field of potential transformer (PT) ferromagnetic resonance elimination, in particular to a PT ferromagnetic resonance elimination method implemented by actively inputting resistance through an electronic load.

BACKGROUND

A nonlinear core of a potential transformer is the root cause of resonance. An electromagnetic potential transformer can be understood as an inductive element with a core. Because the core is nonlinear, when a system is subjected to a certain disturbance, an exciting current changes, and an inductance value of the transformer changes; and when the inductance L and the capacitance C in a loop meet the condition of $\omega L=1/\omega C$, resonance occurs. Here w may be a fundamental angular frequency of the power grid, or it may be a harmonic angular frequency. Therefore, when the harmonic content is larger, the possibility of resonance will increase.

A potential transformer with an open (tertiary) winding is as shown in FIG. 3, and an open-delta potential transformer is as shown in FIG. 10. If there is resonance in the potential transformer, it is easy to cause an overload in a certain phase, which will damage the potential transformer. The technical measures to prevent and eliminate the resonance of the potential transformer can be divided into two categories in principle: changing parameters of a resonant loop and damping resonance. The changing parameters of a resonant loop means changing the parameters of the inductance or capacitance in the resonant loop, so as to destroy the resonance condition and further achieve the purpose of eliminating the resonance. The method of damping resonance is to increase the system damping, that is, to connect a resistor with an appropriate magnitude in series at an opening of an open delta so as to consume resonance energy, thereby achieving the purpose of suppressing or eliminating resonance. At present, most of the resonance elimination products use the damping resonance method. In the resonance elimination process of a potential transformer, when resonance occurs, a small resistor is input to realize a series connection or shorting of the opening. When a system is in normal operation, the voltage at an open delta is 0 V, and the damping resistor connected in parallel will not affect the normal operation. When there is line voltage asymmetry such as single-phase short-circuit grounding, disconnection or other faults, a neutral point will be displaced to make a three-phase voltage asymmetry. It will lead to an increase in the voltage at the open delta, the saturation of a potential transformer core, and the occurrence of zero-sequence magnetic flux. A zero-sequence current flows through a high-voltage winding, which will induce a zero-sequence voltage at both ends of an opening angle. The zero-sequence current flows through the damping resistor connected in parallel to consume resonance energy, thus limiting and destroying ferromagnetic resonance. The greater the secondary zero-sequence current, the better the suppression effect. The effect is best during shorting, but the long-term shorting easily causes overload of the potential transformer and thus burns out the potential transformer. The smaller the resistance input for eliminating resonance, the better the effect of eliminating resonance. The disadvantage is that it is easy to cause core saturation, thus overloading a certain winding of the potential transformer. In severe cases, the potential transformer may be destroyed.

At present, the methods for eliminating resonances in potential transformers are mainly microcomputer-based resonance elimination, and there are also a few active resonance elimination methods. According to the different frequencies at which the resonances occur, the resonances in the potential transformers are divided into power frequency resonance, high frequency resonance and frequency division resonance. Considering that the frequencies of the high frequency resonance and the frequency division resonance are different from a power frequency of 50 Hz, it is easy to achieve the effect of resonance elimination for the high frequency resonance and the frequency division resonance by using the method of microcomputer-based resonance elimination. For the power frequency resonance, considering that there is a power frequency voltage at an opening of an open delta, and the characteristics of the power frequency resonance are basically the same as those of single-phase-to-earth fault, there is no way to achieve the purpose of resonance elimination by using the microcomputer-based resonance elimination. The extremely difficult situation is that the voltage at the opening of the open delta is less than 100 V. In a case that single-phase grounding occurs, resonance elimination resistance input during resonance elimination or the shorted opening causes the overload of an open delta winding, which leads to core saturation, so that a new potential transformer resonance phenomenon is formed. If the active resonance elimination method is adopted, this contradiction can be well resolved.

The active resonance elimination is an adjustment method for automatic tracking of resonance elimination resistance of a potential transformer. It can solve the contradiction between a magnitude of resonance elimination resistance and winding overload in an open delta of the potential transformer when single-phase grounding occurs, can also solve the problem of difficult distinguishing between single-phase-to-earth fault characteristics and power frequency resonance characteristics, and can deal with power frequency resonance. However, in related products, the magnitude of a resistance box used for resonance elimination is discrete, which leads to significant jumping and hysteresis during the resonance elimination, thus greatly reducing the effectiveness of real-time tracking. The conventional active resonance elimination is often implemented by the inputting rheostats and actuators, but there is no active resonance elimination solution for those without the rheostats and the actuators. In view of this, we propose a PT ferromagnetic resonance elimination method implemented by actively inputting resistance through an electronic load.

SUMMARY

The purpose of the present disclosure is to provide a PT ferromagnetic resonance elimination method implemented by actively inputting resistance through an electronic load, so as to solve the problems raised in the above-mentioned background art.

In order to solve the above-mentioned technical problems, one of the purposes of the present disclosure is to provide a PT ferromagnetic resonance elimination method implemented by actively inputting resistance through an electronic load, which includes the following steps:

S1: setting up a PT including primary, secondary and open (tertiary) windings, and determining a mapping relationship between a secondary voltage and an open (tertiary) voltage;

S2: based on a resistance matching algorithm and a PID control strategy, constructing a resonance elimination control system and presetting a resistance active-matching strategy; and S3: designing an engineering solution of using the electronic load to replace a DC motor and a circular rheostat for inputting resistance as an active resonance elimination device, the specific operating principle of the active resonance elimination device including the following steps:

S3.1: accumulation of resonance energy: when in normal operation or when a three-phase load of the system is slightly unbalanced, not starting the active resonance elimination device;

S3.2: slow energy consumption process: when the three-phase load of the system is unbalanced, the system has earth fault, etc., starting the active resonance elimination device, inputting the resonance elimination resistance $R_0$, and consuming electrostatic energy accumulated in a zero-sequence loop of the system;

S3.3: resonance energy jump (resonance excitation): if PT resonance excitation is caused by the disappearance of the earth fault of the system, lightning stroke, or operations such as a closing operation, allowing PT core characteristics to undergo an energy jump;

S3.4: when a core tends to be saturated, converting the electrostatic energy stored in the zero-sequence loop (capacitance) of the system into electromagnetic energy in the PT core;

S3.5: rapid energy consumption process I: inputting the minimum resonance elimination resistance $R_{min}$ into the open (tertiary/delta) winding to consume the electromagnetic energy; and S3.6: rapid energy consumption process II: after the completion of $R_{min}$ input for 40 ms, entering the rapid energy consumption process II, inputting the initial resistance $R_{i0}$ at this time, monitoring the current A of the open (tertiary) winding, and adjusting a duty cycle of the $I_s$ by means of a metal oxide semiconductor field effect transistor (MOSFET) to achieve the real-time dynamic adjustment of $R_i$.

As a further improvement of the technical solution, in step S1, when the PT including the primary, secondary and open (tertiary) windings is set up, if it is first assumed that $U_a$, $U_b$, and $U_c$ are respectively effective values of a three-phase voltage at the side of the secondary winding of the PT under normal operation, $U_s$ is an effective value of a port voltage of the open (tertiary) winding that can be directly measured from an opening, $U_{da}$, $U_{db}$, and $U_{dc}$ are respectively effective values of the three-phase voltage at the side of the opening (tertiary) winding of the PT under normal operation, $U_o$ is an effective value of a neutral point-to-ground voltage, i.e., a zero-sequence voltage, and $U_s = U_{da} + U_{db} + U_{dc} = 3U_o$; and then, the mapping relationship between the secondary voltage and the open (tertiary) voltage is as follows:

$U_a = \sqrt{3}U_{da}$, $U_b = \sqrt{3}U_{db}$, $U_c = \sqrt{3}U_{dc}$;

$U_{max} = \max\{U_a, U_b, U_c\}$;

$U_{dmax} = \max\{U_{da}, U_{db}, U_{dc}\}$;

$U_{max} = \sqrt{3}U_{dmax}$.

As a further improvement of the technical solution, according to the engineering solution of using the electronic load to replace the DC motor and the circular rheostat for inputting the resistance in step S3, the implementation principle of the electronic load is as follows:

the electronic load selects the initial resistance $R_{i0}$, the magnitude of which is the minimum when the resistance is put into operation;

further, the electronic load performs full-wave rectification and transformation on the $U_s$ of the open (tertiary) winding by means of a rectifier bridge, thus becoming a pulsating signal with only positive polarity; and after being input, the initial resistance $R_{i0}$ is modulated by the MOSFET controlled by a PWM signal of 50000 Hz, so that an equivalent matching resistance for resonance elimination is obtained.

As a further improvement of the technical solution, in step S3.1, under the condition of $U_s = 3U_o < 7V$, the three-phase load of the system is slightly unbalanced, and the active resonance elimination device is not started.

As a further improvement of the technical solution, in step S3.2, the calculation formula of the resonance elimination resistance $R_0$ is as follows:

$$R_0 = \frac{\sqrt{3}\,U_s^2}{3kP_t};$$

in the formula, Pt is a rated power of the PT, and k is a voltage multiple of the excitation characteristic of the PT, which is generally 1.9.

As a further improvement of the technical solution, in step S3.3, the changes in the PT core characteristics before and after undergoing the energy jump are as follows:

if $\omega_1$ is a harmonic angular frequency of a resonance point before the PT core characteristics undergo the energy jump, $\omega_2$ is a harmonic angular frequency of the resonance point after the PT core characteristics undergo the energy jump, and $\varphi$ is a magnetic flux of the PT core, then:

$$\omega_1 = \frac{1}{\sqrt{LC}};$$

$$\omega_2 = \frac{1}{\sqrt{L_s C}};$$

$$\Phi = \frac{U_0}{\omega_1}\sin\omega_1 t;$$

$$U = U_0 \cos\omega_1 t;$$

in the formula, L is an inductance obtained before the PT core characteristics undergo the energy jump, $L_s$ is an inductance obtained after the PT core characteristics undergo the energy jump, C is a capacitance of the system, and U is a real-time voltage during the energy jump of the PT core characteristics, and t is a time point.

As a further improvement of the technical solution, in step S3.5, the electromagnetic energy consumed in the rapid energy consumption process I is the electromagnetic energy in the PT core converted from the electrostatic energy stored in the zero-sequence loop (capacitance) of the system in step S3.4.

As a further improvement of the technical solution, in the rapid energy consumption process II of step S3.6, the calculation method for inputting the initial resistance $R_{i0}$ is as follows:

$$R_{i0} = \frac{U_{max} \cdot U_s}{\sqrt{3} P_e};$$

in the formula, $P_e$ is a rated thermal load of the PT; and then, the basis for real-time dynamic adjustment of $R_i$ (the magnitude of the resistance input in real time) is as follows:

$$I_s \cdot U_s = P_e.$$

The second purpose of the present disclosure is to provide a method for running a platform device. The device includes a processor, a memory, and a computer program which is stored in the memory and runs on the processor, where the processor is used to implement the steps of the PT ferromagnetic resonance elimination method implemented by actively inputting resistance through an electronic load when executing the computer program.

The third purpose of the present disclosure is to provide a computer-readable storage medium, in which the computer program is stored. When the computer program is executed by the processor, the steps of the PT ferromagnetic resonance elimination method implemented by actively inputting resistance through an electronic load are implemented.

Compared with the prior art, the present disclosure has the following beneficial effects.

1. The present disclosure not only overcomes a contradiction between the magnitude of the resonance elimination resistance and the winding overload in the open delta of the PT during single-phase-to-earth fault and fault clearance, but also effectively avoids the technical problems of difficult distinguishing between the single-phase-to-earth fault characteristics and the power frequency resonance characteristics and causing resonance in a single-phase-to-earth fault process. Compared with previous disclosure designs, the present disclosure directly measures parameters, and is simple in algorithm, low in computational complexity, rapid in arithmetic speed, high in precision and less in error.

2. In addition to using the rated power of the PT as a target value of PID, the present disclosure dynamically adjusts the magnitude of input resistance, thereby adjusting the current of the open (tertiary) winding, so that the open (tertiary) winding is not overloaded, and the purpose of preventing the ferromagnetic resonance of the PT in an active manner can be achieved at the fastest speed. Furthermore, the present disclosure can realize flexible and dynamical adjustment, and is smooth in curve without jumping, so that new resonance will not be caused.

DETAILED DESCRIPTION

The technical solutions in embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the scope of the protection of the present disclosure.

Embodiment 1

As shown in FIG. 1 to FIG. 12, this embodiment provides a PT ferromagnetic resonance elimination method implemented by actively inputting resistance through an electronic load, including the following steps:

S1: setting up a PT including primary, secondary and open (tertiary) windings, and determining a mapping relationship between a secondary voltage and an open (tertiary) voltage;

S2: based on a resistance matching algorithm and a PID control strategy, constructing a resonance elimination control system and presetting a resistance active-matching strategy; and S3: designing an engineering solution of using the electronic load to replace a DC motor and a circular rheostat for inputting resistance as an active resonance elimination device, the specific operating principle of the active resonance elimination device including the following steps:

S3.1: accumulation of resonance energy: when in normal operation or when a three-phase load of the system is slightly unbalanced, not starting the active resonance elimination device;

S3.2: slow energy consumption process: when the three-phase load of the system is unbalanced, the system has earth fault, etc., starting the active resonance elimination device, inputting the resonance elimination resistance $R_0$, and consuming electrostatic energy accumulated in a zero-sequence loop of the system;

S3.3: resonance energy jump (resonance excitation): if PT resonance excitation is caused by the disappearance of the earth fault of the system, lightning stroke, or operations such as a closing operation, allowing PT core characteristics to undergo an energy jump;

S3.4: when a core tends to be saturated, converting the electrostatic energy stored in the zero-sequence loop (capacitance) of the system into electromagnetic energy in the PT core;

S3.5: rapid energy consumption process I: inputting the minimum resonance elimination resistance $R_{min}$ into the open (tertiary/delta) winding to consume the electromagnetic energy; and S3.6: rapid energy consumption process II: after the completion of $R_{min}$ input for 40 ms, entering the rapid energy consumption process II, inputting the initial resistance $R_{i0}$ at this time, monitoring the current $I_s$ of the open (tertiary) winding, and adjusting a duty cycle of the $I_s$ by means of a metal oxide semiconductor field effect transistor (MOSFET) to achieve the real-time dynamic adjustment of $R_i$.

Figure 3:
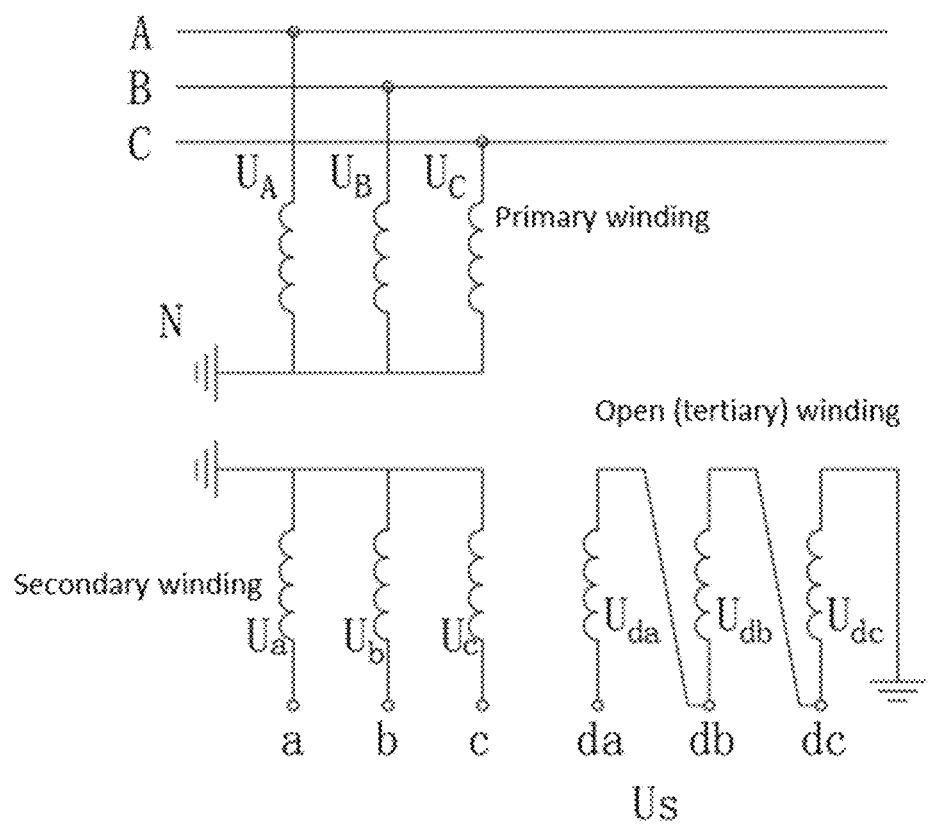
FIG. 3 is a schematic diagram showing the wiring of an exemplary potential transformer according to the present disclosure.
Figure 4:
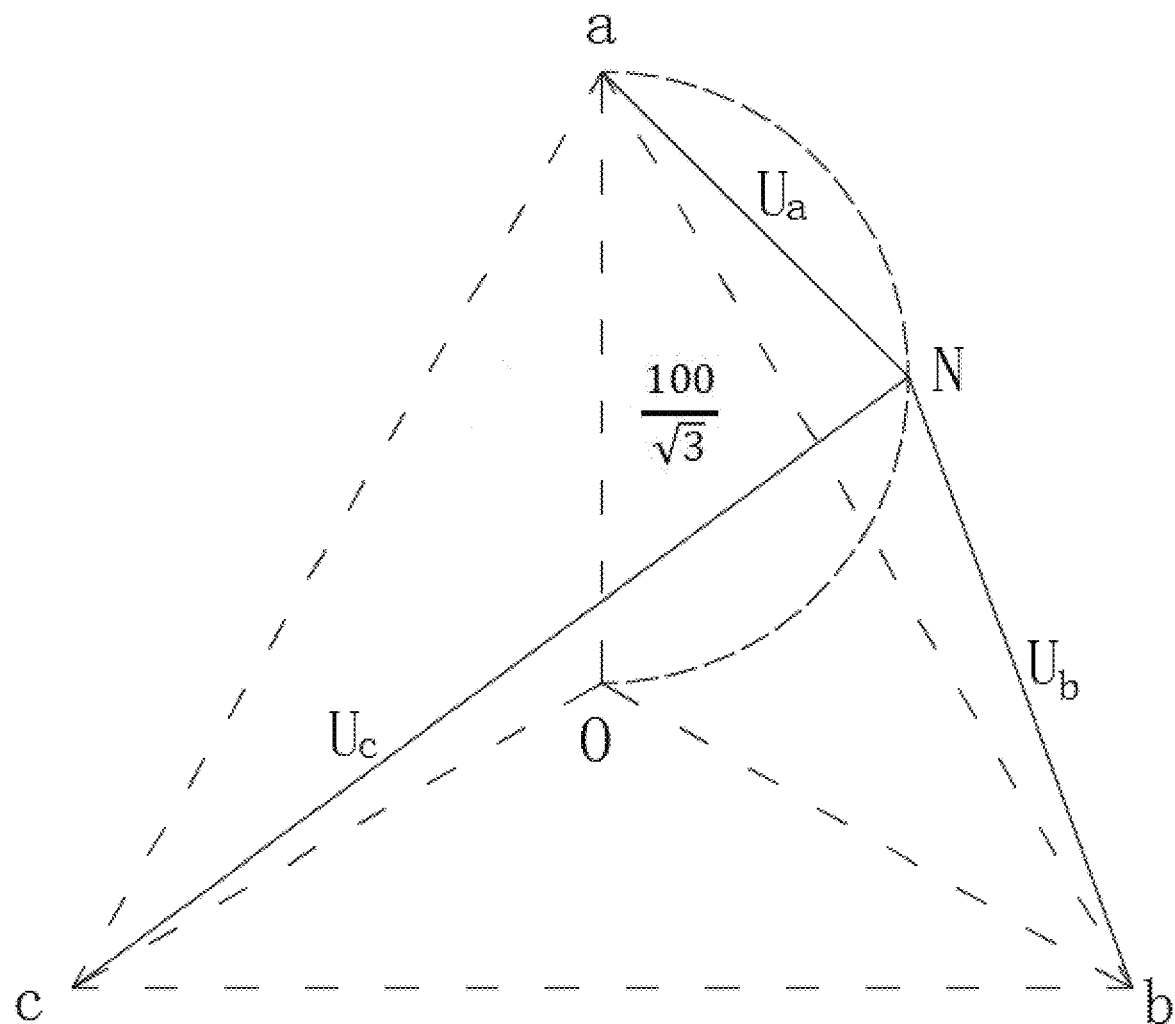
FIG. 4 is one of diagrams about a mapping relationship between a secondary voltage and an open (tertiary) voltage.
Figure 5:
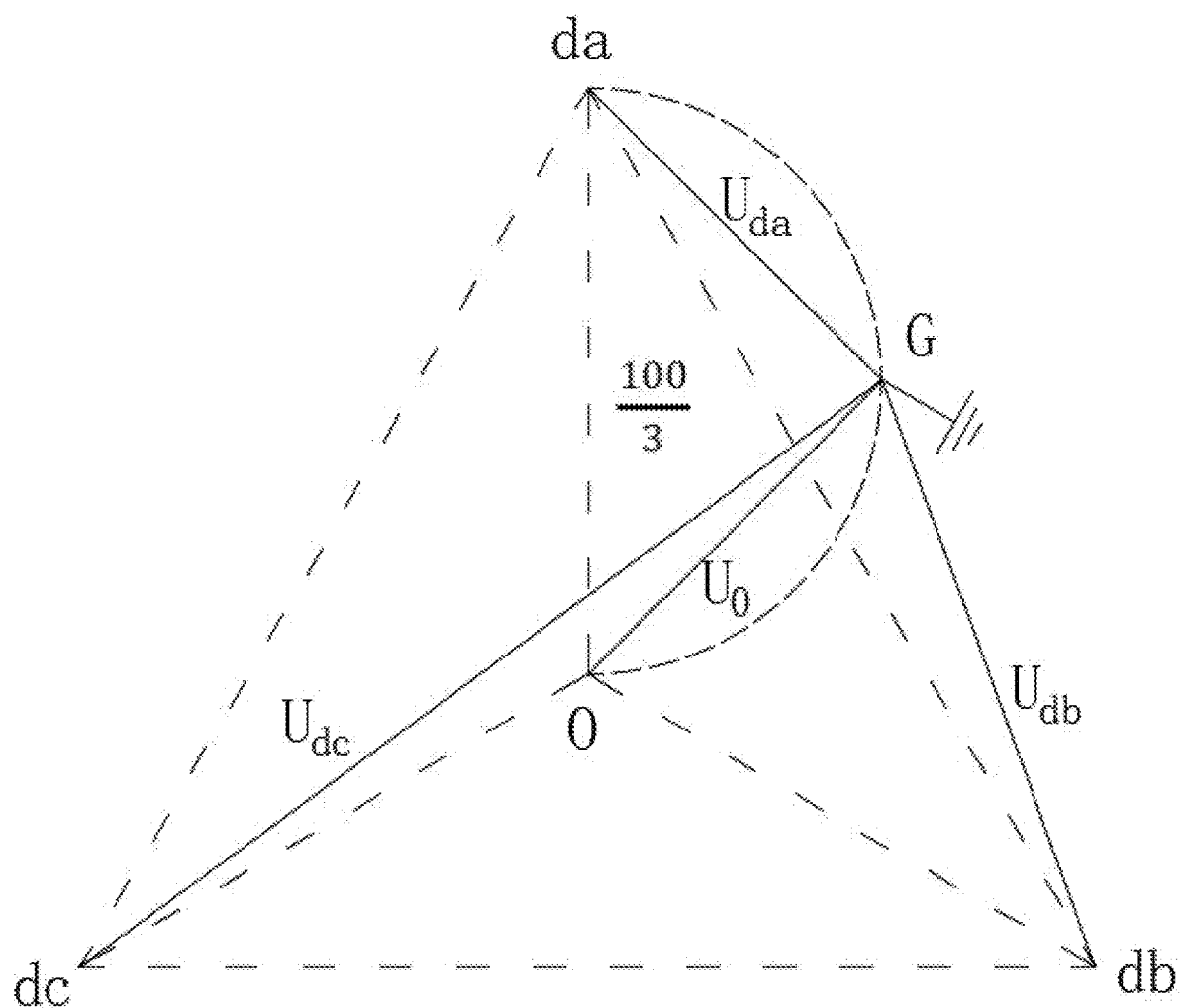
FIG. 5 is the second diagram about the mapping relationship between the secondary voltage and the open (tertiary) voltage.

In this embodiment, as shown in FIG. 3 to FIG. 5, in step S1, when the PT including the primary, secondary and open (tertiary) windings is set up, if it is first assumed that $U_a$, $U_b$, and $U_c$ are respectively effective values of a three-phase voltage at the side of the secondary winding of the PT under normal operation, $U_s$ is an effective value of a port voltage of the open (tertiary) winding that can be directly measured from an opening, $U_{da}$, $U_{db}$, and $U_{dc}$ are respectively effective values of the three-phase voltage at the side of the opening (tertiary) winding of the PT under normal operation, $U_o$ is an effective value of a neutral point-to-ground voltage, i.e., a zero-sequence voltage, and $U_s=U_{da}+U_{db}+U_{dc}=3U_o$; and then, the mapping relationship between the secondary voltage and the open (tertiary) voltage is as follows:

$$U_a=\sqrt{3}U_{da}, \ U_b=\sqrt{3}U_{db}, \ U_c=\sqrt{3}U_{dc};$$

$$U_{max}=\max\{U_a,U_b,U_c\};$$

$$U_{dmax}=\max\{U_{da},U_{db},U_{dc}\};$$

$$U_{max}=\sqrt{3}U_{dmax}.$$

Figure 10:
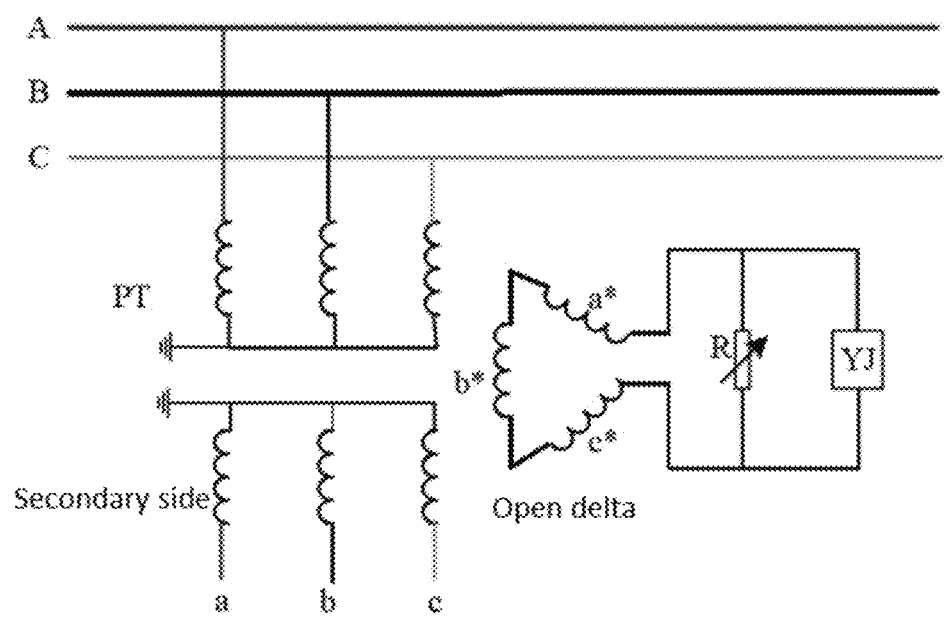
FIG. 10 is a circuit diagram of an exemplary open-delta potential transformer according to the present disclosure.
Figure 11:
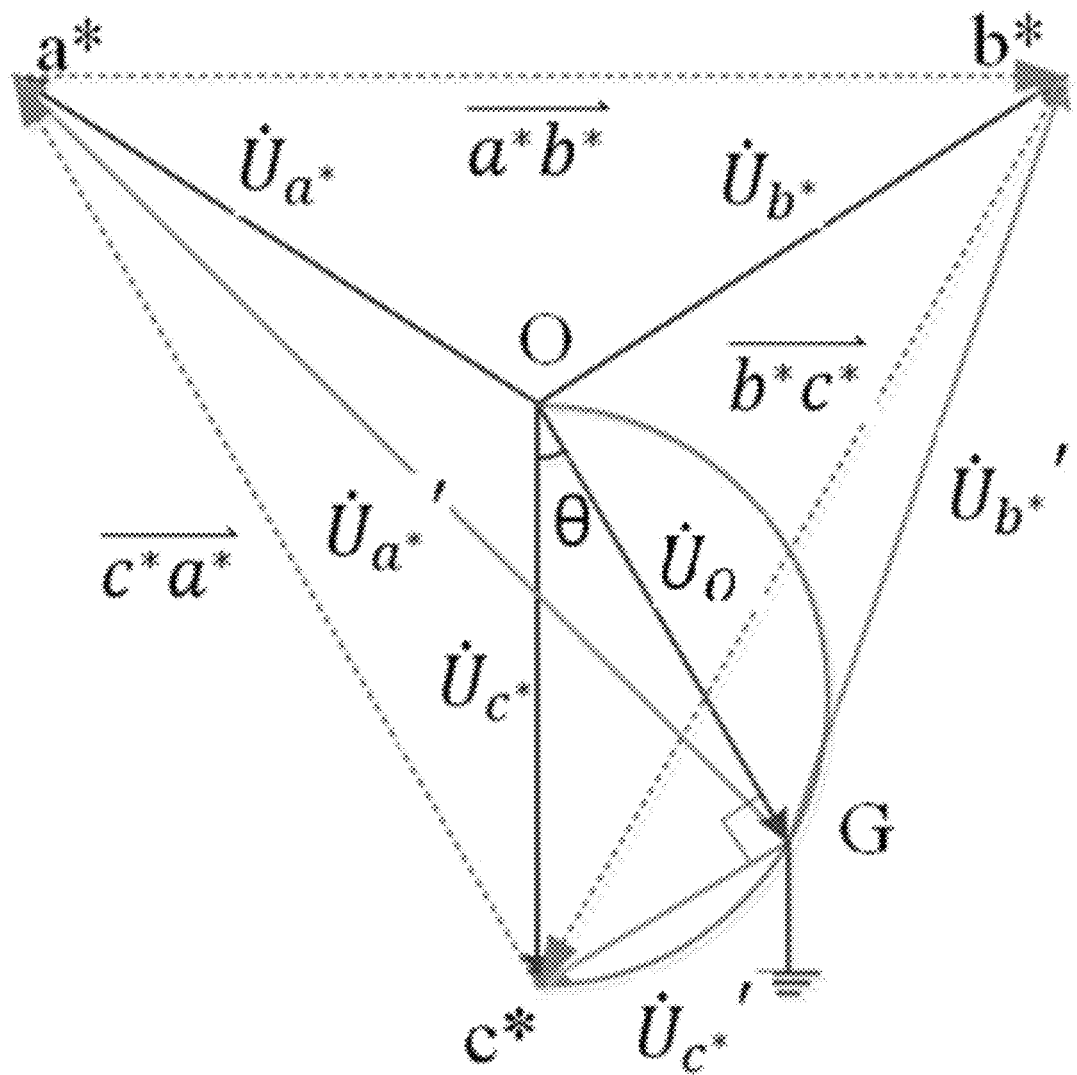
FIG. 11 is a vector diagram of a three-phase voltage at an exemplary open delta according to the present disclosure.

In this embodiment, as shown in FIG. 10 and FIG. 11, the specific method of step S2 includes the following steps:

compiling resistance matching algorithms: analyzing the voltage amplitudes and phase sequences in different situations of the PT in a power grid system, so as to obtain the corresponding resistance matching algorithms, respectively;

based on the PID control strategy, constructing a resonance elimination control system; and presetting, according to different voltage conditions, the resistance active-matching strategy by using the above resonance elimination control system so as to achieve the dynamic adjustment of resonance elimination matching resistance.

In the above-mentioned steps, the different situations of the PT in the power grid system include system single-phase non-metallic grounding, normal situations, system single-phase metal grounding, non-metallic grounding, system three-phase imbalance, etc. Specifically:

Firstly, assuming that an effective value of a port voltage of the open delta winding that can be directly measured from the opening is $U_r$, and its phasor is expressed as $\dot{U}_r$, at this time, the voltage vector of the open delta three-phase winding is as shown in FIG. 11. Further, according to the phase sequence representation in FIG. 10, the phase sequences of the open delta three-phase winding are expressed as a*, b*, and c*, which is used to distinguish the phase sequences of primary side and secondary side voltages of the PT, thus facilitating vector analysis.

A neutral point is O, and a single-phase non-metallic grounding point on the primary side is G (in FIG. 11, C-phase non-metallic grounding is taken as an example, and if metal grounding occurs, it can be understood as that the point G coincides with a point c*). At the same time, $U_{a*}=U_{b*}=U_{c*}=100 \text{ V}/3$ is an effective value of an open delta three-phase voltage under normal operation, and the phasor representations respectively correspond to $\dot{U}_{a*}$, $\dot{U}_{b*}$ and $\dot{U}_{c*}$, which respectively correspond to three vector line segments that start from the point O and point to a*, b*, and c* in FIG. 11. $U_o=U_r/3$ is an effective value of the neutral point-to-ground voltage, called zero-sequence voltage, and its phasor is expressed as $\dot{U}_o$, which corresponds to a vector line segment which starts from the point O and points to the point G in FIG. 11.

$$\theta = \arccos\frac{U_r}{100}$$

is a phase voltage angle formed by the zero-sequence voltage and the open delta corresponding to the grounded phase.

Therefore, when single-phase-to-earth fault occurs in the system, the characteristics of the single-phase-to-earth fault are very similar to those of power frequency resonance.

Under normal circumstances, there is no voltage at both ends of the opening of the open delta, i.e., $\dot{U}_r=\dot{U}_{a*}+\dot{U}_{b*}+\dot{U}_{c*}=0$ V.

When single-phase metal grounding occurs in the system, there will be no voltage on a certain phase in the primary winding of the PT, which results in no voltage on the corresponding phase in the secondary winding of the PT, so that a voltage of 100 V will appear on the open delta, i.e., $U_r=100$ V.

Taking FIG. 11 as an example: When a phase C is subjected to single-phase metal grounding, the point G coincides with the point c*, $\dot{U}_o$ coincides with $\dot{U}_{c*}$, and then $U_o=U_{c*}=100 \text{ V}/3$. Considering $U_o=U_r/3$, $U_r$ is 100 V. It can also be interpreted as $\dot{U}_r$ being equal to the sum of a vector of $\overrightarrow{c^*a^*}$ and a vector of $\overrightarrow{c^*b^*}$, that is, $\dot{U}_r=\sqrt{3}\times\sqrt{3}\dot{U}_{c*}$.

When non-metallic grounding occurs: in FIG. 11, the phase C is subjected to non-metallic grounding, the point G does not coincide with the point c*, i.e., $\dot{U}_o$ does not coincide with $\dot{U}_{c*}$, and the point G moves on the semicircle in FIG. 11 depending on the grounding situation. Considering that the grounding situation has already occurred, the three-phase voltage of the open delta is shown in FIG. 11, i.e., $\dot{U}_{a*}$, $\dot{U}_{b*}$ and $\dot{U}_{c*}$ in FIG. 11 (respectively corresponding to three vector line segments that start from the point G and point to a*, b*, and c*). At this point, $\dot{U}_r=\dot{U}_{a*}'+\dot{U}_{b*}'+\dot{U}_{c*}'=3\dot{U}_o$, that is, the phase angle (direction) of $\dot{U}_r$ is the same as that of $\dot{U}_o$, and the modulus (length) ratio of the $\dot{U}_r$ to $\dot{U}_o$ is equal to 3:1. At this point, in the three phases of the open delta, the effective value $U_{a*}'$ of the voltage of the phase a* is the maximum, and its apparent power is also the maximum, so the phase a* is the easiest to overload. If it is ensured that the phase a* is not overloaded, the other two phases will definitely not be overloaded. In FIG. 11, $U_{a*}'$ can be calculated by using vector calculation in conjunction with geometric principles, and the formula is as follows:

$$U_{a*}' = \sqrt{U_o^2 + U_{a*}^2 - 2U_o U_{a*} \cos\left(120 + \arccos\frac{U_r}{100}\right)}. \quad (1)$$

Considering $U_r=3U_o$, and $U_{a*}=100$ V/3, it is obtained that:

$$U_{a*}' = \frac{1}{3}\sqrt{U_r^2 + 100^2 - 200U_r \cos\left(120 + \arccos\frac{U_r}{100}\right)}. \quad (2)$$

In FIG. 11, when the angle θ is 60°, $\overrightarrow{OG}$ and $\overrightarrow{Oa^*}$ are collinear, and $U_o=U_{a*}/2$, so that $U_{a*}=50$ V, and $U_r=50$ V.

The magnitude of the resonance elimination resistance is $R_x$, and the current at the open delta is $I_r$. Then, $I_r=U_r/R_x$; and S is the rated power of each phase winding of the open delta, and $U_m$ is the maximum value of the phase voltage of the three phases of the open delta winding (tertiary winding). In FIG. 11, when the phase C is subjected to non-metallic grounding, the voltage of the phase a* in the open delta is the maximum, and at this time, $U_m=U_{a*}'$. $U_{IIm}$ is taken as the maximum phase voltage of the secondary winding of the PT (the phase voltage at the three-phase secondary side of the PT is shown by the dotted line vector in FIG. 11), and $U_{IIm}=\sqrt{3}U_m$ is obtained according to a winding ratio relation.

The excitation characteristics of the conventional potential transformers are designed according to 1.9 times of a phase rated voltage. This multiple proportion is represented by K. The K of the conventional potential transformers is 1.9, indicating that the overload capacity of the conventional potential transformers can reach 1.9 times their apparent power. If overloading is within 1.9 times, core saturation will not be caused. There is also a potential transformer that is resistant to saturation resonance, and its K value can be taken as 2.5.

In the open delta, under the premise of not overloading, according to the power relationship, it can be obtained:

$U_m I_r \leq KS$ or $U_m U_r/R_x \leq KS$, that is:

$$R_x \geq \frac{U_m U_r}{KS}. \quad (3)$$

Considering the non-metallic grounding of the phase C and the maximum voltage of the phase a*, $U_m$ is equal to $U_{a*}'$ at this time, combined with formula (2), it can be concluded that:

$$R_x \geq \frac{U_r}{3KS}\sqrt{U_r^2 + 100^2 - 200U_r \cos\left(120 + \arccos\frac{U_r}{100}\right)}. \quad (4)$$

For example, when the phase C is subjected to metallic grounding, and $U_r$ is 100 V, θ is 0°, and then the value of $R_x$ at this time is:

$$R_{x100} = \frac{10000}{\sqrt{3}KS}.$$

Further, the disappearance of earth faults is also a way to excite ferromagnetic resonance, but there must be a transitional process between grounding and resonance. During this transition process, there will be significant changes in voltage. When a voltage change is detected in the transition process, the input of the resonance elimination resistance must be corrected and matched before being put back into operation.

Therefore, when the three phases of the system are unbalanced, the neutral point of the system will drift, and there will be a power frequency voltage in the open delta. During actual operation, the power frequency voltage generally does not exceed 15 V. Considering that a resonance point of the power frequency resonance will not fall within the triangle of a line voltage (i.e., the triangle formed by the three points a*, b* and c* in FIG. 11), the nearest distance from the neutral point to the line voltage is half of the phase voltage, i.e., when the angle θ is 60°, $U_r=3U_o=50$ V is much greater than 15 V at this time. As a result, the power frequency voltage with the open delta voltage $U_\Delta$ less than 50 V is definitely not caused by the power frequency resonance of the potential transformer.

Therefore, if $U_r$ is less than or equal to 15 V, it may be caused by the three-phase imbalance in the system, or it may be caused by single-phase non-metallic earth fault, or it may be caused by high-order harmonic ferromagnetic resonance or frequency division ferromagnetic resonance. If $U_r$ is greater than 15 V and less than 50 V, it may be caused by the single-phase non-metallic earth fault, or it may be caused by the high-order harmonic ferromagnetic resonance or the frequency division ferromagnetic resonance.

Then, when $U_r$ is less than or equal to 15 V, considering the possibility of three-phase imbalance in the system, active resonance elimination matching resistance needs to ensure that the open delta three-phase winding is never overloaded. At this time, the overload prevention condition is estimated based on the imbalance relationship of the three phases of the system. According to the actual grid system operation result $U_r \leq 15$ V, the maximum phase voltage at the secondary winding side of the corresponding potential transformer is:

$$U_{IIm} = \frac{\sqrt{3}}{3}(U_r + 100). \quad (i)$$

Thus, when the three phases of the system are unbalanced, the value of the resonance elimination resistance $R_x$ that is actively input is the minimum value $R_{x15}$, which is:

$$R_{x15} = \frac{U_r(U_r + 100)}{3KS}. \quad (6)$$

Specifically, the basic prerequisites for compiling the resistance matching algorithms are as follows: a two-phase or three-phase short circuit will generally be quickly troubleshot by means of a microcomputer protection device in the running system within 700 ms, so matching the resistance with any magnitude in the open delta will not cause overload damage to the potential transformer within 700 ms.

The worst case is that the two phases located in different places are subjected to grounded short circuit through large resistance. Although the probability of this situation is small, due to the small short-circuit current, the microcomputer protection device cannot detect and timely remove the fault at this time, resulting in the fault remaining for a long time.

In this case, there may be a situation where due to off-site shorting, the voltages of two phases decrease while the voltage of the other phase remains unchanged, and there is no increase in the voltages of the three phases. Considering that in the foregoing resistance matching algorithms, since the maximum phase voltage was used to match the resistance, it is obvious that even if this small probability situation occurs, after the matching resistance is put into operation, it will not overload the potential transformer.

Further, the specific method for constructing the resonance elimination control system based on the PID control strategy is as follows:

First of all, on the basis of active resonance elimination, PID control strategy is employed. Further PI control is mainly adopted according to the engineering characteristics of controlling a magnitude of resistance. That is, a proportional control algorithm and an integral control algorithm in a PID controller are used.

This kind of PID automatically adjusts the resonance elimination resistance to run online for a full period of time, and gradually inputs the resonance elimination resistance via the proportional control algorithm. At the same time, the integral control algorithm is used to control and eliminate the steady-state error occurring in the proportional control algorithm, so that the resonance of the potential transformer approaches the minimum set target value or almost zero. That is, the ferromagnetic resonance of the potential transformer is actively prevented.

Finally, the above ferromagnetic resonance elimination control system can dynamically adjust the resonance elimination matching resistance by tracking the changes of $U_r$ in real time at a cycle of 100 ms.

Further, the resistance active-matching strategy is as follows:

By detecting the voltage $U_r$ at the opening, if $U_r$ is 0 V, the three phases of the power grid system are balanced. At this time, inputting resistance with a matched magnitude has no effect on the open delta. Considering that during the actual operation of the power grid, the situation of three-phase imbalance is difficult to avoid, the matched magnitude of the input resistance is calculated according to a formula (6), and $U_r$=5 V, that is, the magnitude of the input resistance is $$R_{x5} = \frac{U_r(U_r + 100)}{3KS}.$$

Further, if $U_r$ changes, adjustment is performed according to the following strategies.

Strategy 1

When $U_r$ is less than or equal to 15 V, according to the statistical results as shown in Table 1 below, it may be caused by load imbalance, or it may be caused by single-phase-to-earth fault, or it may be caused by high-order harmonic ferromagnetic resonance or frequency division ferromagnetic resonance. At this time, the above-mentioned resonance elimination control system will dynamically calculate according to the formula (6), and match the magnitude of the resistance at a cycle of 100 ms.

| Single-phase-to-earth Fault and PT Ferromagnetic Resonance | | | | |
|---|---|---|---|---|
| | | Line voltage | Phase voltage | Voltage $3U_o$ or $U_r$ at an open delta |
| Single-phase grounding | Metallic grounding | The magnitude, direction, and symmetry remain unchanged. | The phase voltage of the grounding phase is 0, and the other two phases are raised to line voltage. | 100 V |
| | Non-metallic grounding | | The three-phase voltage varies with the magnitude of the grounding resistance and the capacitance of the system to ground, and the effective values of the three phases are not equal | Less than 100 V |
| PT ferromagnetic resonance | Power frequency ferromagnetic resonance | | Single phase or two phases increase(s) by an equivalent value and exceed(s) the line voltage, and the voltage magnitude(s) of the other two phases or the other phase decrease(s). | The single-phase rise is less than 100 V and greater than 50 V, and the two-phase rise is greater than 100 V. |
| | Frequency division ferromagnetic resonance | | The voltages of the three phases rise simultaneously and oscillate simultaneously. | There is a zero-sequence voltage with varying magnitudes. |
| | High-order harmonic ferromagnetic resonance | | The voltages of the three phases rise simultaneously. | |

If $U_r$ is caused by the single-phase-to-earth fault of the system or the three-phase imbalance of the system, under the condition that $U_r$ is less than or equal to 15 V, the resonance elimination control system will keep dynamically calculating the matching the magnitude of the resistance according to the formula (6) until the fault is eliminated. If the potential transformer is in a non-power frequency ferromagnetic resonance state, the energy will inevitably be released quickly until the resonance energy disappears. After the resonance energy is released, or after the fault is eliminated, the resistance with the magnitude of $R_{x5}$ is input when $U_r$ is less than or equal to 5 V.

Strategy 2

When $U_r$ is greater than 15 V and less than or equal to 100 V, according to the statistical results as shown in Table 1 above, there are various reasons for the change of $U_r$, which can be roughly divided into two categories. One type is caused by ferromagnetic resonance. When $U_r$ is less than or equal to 50 V, the ferromagnetic resonance can only be non-power frequency ferromagnetic resonance. When $U_r$ is greater than 50 V, the ferromagnetic resonance can be both non-power frequency ferromagnetic resonance and power frequency ferromagnetic resonance are possible. The other type is caused by various faults represented by single-phase non-metallic grounding. At this time, the resonance elimination control system provided by the present disclosure will dynamically calculate according to the formula (4), and match the magnitude of the resistance at a cycle of 100 ms.

If $U_r$ is caused by various faults of the system, under the condition that $U_r$ is greater than 15 V and less than or equal to 100 V, the resonance elimination control system will keep dynamically calculating the matching the magnitude of the resistance according to the formula (4) until the fault is eliminated. If the potential transformer is in a power frequency ferromagnetic resonance state, the energy will inevitably be released quickly until the resonance energy disappears. After the resonance energy is released, or after the fault is eliminated, it is processed according to Strategy 1 when $U_r$ is less than or equal to 15 V.

Strategy 3

When $U_r$ is greater than 100 V, considering that $U_r$ exceeds the calculation range of formula (4), and the overload pressure of the winding of each phase of the open delta is much larger than those under the conditions described in Strategy 1 and Strategy 2. Referring to Table 1 above, when the two phases of the power frequency ferromagnetic resonance increase by an equivalent value, $U_r$ will may be greater than 100 V. At this time, the above-mentioned resonance elimination control system will match the resonance resistance with twice the magnitude of $R_{x100}$. At this time, the resonance matching resistance is a bit large, but it can ensure that all the phases of the open delta will not be overloaded. Meanwhile, the resonance elimination control system dynamically tracks the value of $U_r$; and with the release of resonance energy, the value of $U_r$ will eventually be less than 100 V, and then it is executed according to Strategy 2.

In addition, in order to avoid the system resonance which is easy to occur during fault recovery, an engineering solution of inputting resistance is used in the conventional technology, mainly as follows:

The input resistance is a high-power porcelain disc-loaded adjustable sliding rheostat, and its power is converted according to the S value and K value of the open delta of the potential transformer as well as the magnitude of the resistance input when the opening voltage is 100 V. Generally, the selected power P is not less than $2.5 \times 10000/R_{x100}$. The maximum magnitude of the resistance is not less than 2.5 times $R_{x100}$.

As long as the power meets the driving requirements, DC brushed gear motors can be employed as actuators. Through the connection between output shafts of the gear motors and a rotating shaft of the sliding rheostat, the DC motors are driven by a PI algorithm control mode to push the sliding rheostat to rotate until reaching the magnitude of the matching resistance.

Figure 1:
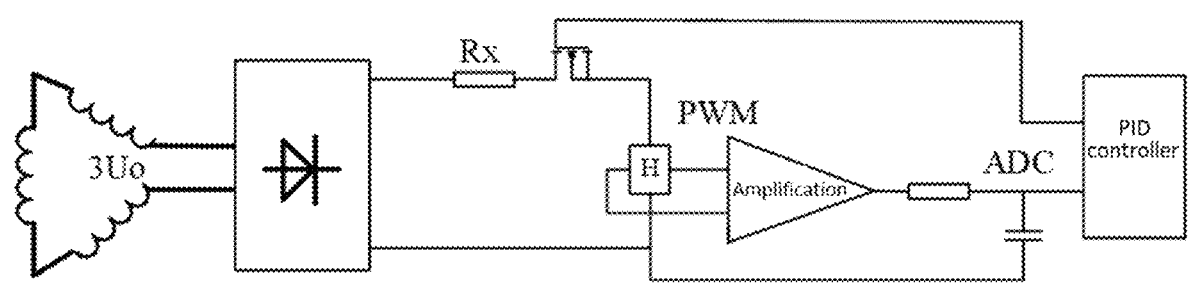
FIG. 1 is a control structure block diagram of an exemplary engineering solution for inputting an electronic load according to the present disclosure.
Figure 2:
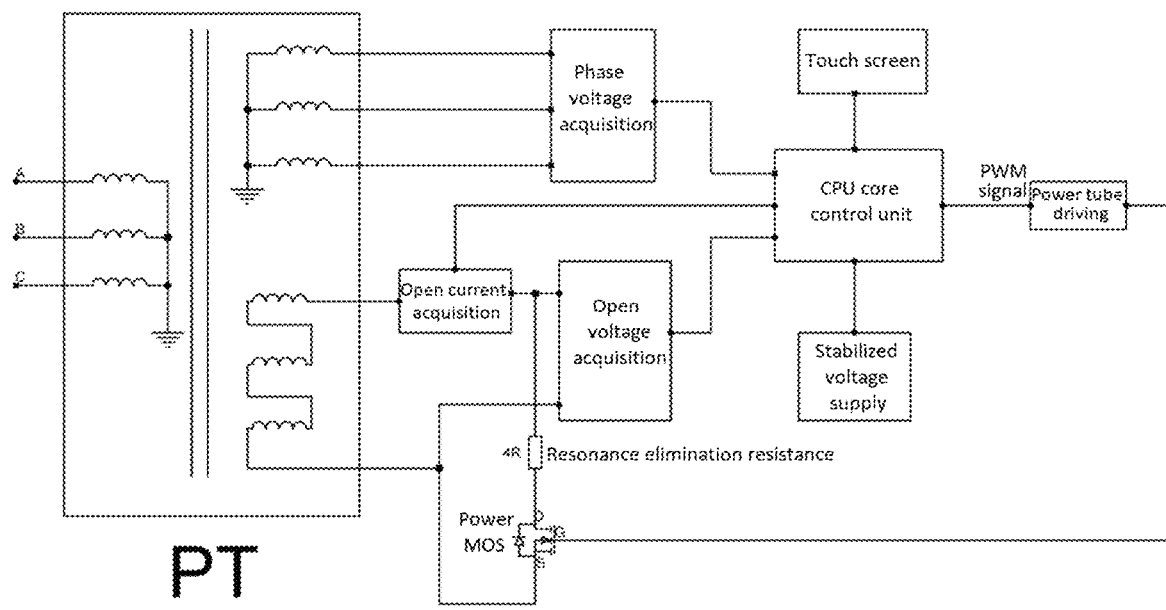
FIG. 2 is a system block diagram of an exemplary active resonance elimination device according to the present disclosure.

Further, in order to be applicable to a PT ferromagnetic resonance elimination system without a rheostat and actuators, as shown in FIG. 1 and FIG. 2, according to this embodiment, in the engineering solution of using the electronic load to replace the DC motor and the circular rheostat for inputting the resistance in step S3, the implementation principle of the electronic load is as follows:

The electronic load selects the initial resistance Rio, the magnitude of which is the minimum when the resistance is put into operation.

Further, the electronic load performs full-wave rectification and transformation on the $U_s$ of the open (tertiary) winding by means of a rectifier bridge, thus becoming a pulsating signal with only positive polarity.

After being input, the initial resistance $R_{i0}$ is modulated by the MOSFET controlled by a PWM signal of 50000 Hz, so that an equivalent matching resistance for resonance elimination is obtained.

The accuracy of the equivalent matching resistance is controlled by a PID closed loop. In the control closed loop, the loop current $I_r$ is collected by a Hall sensor; and after being subjected to amplification and conditioning, the current is handed over to a controller for AD (analog to digital) conversion.

According to this embodiment, in step S3.1, under the condition of $U_s=3U_o<7V$, the three-phase load of the system is slightly unbalanced, and the active resonance elimination device is not started.

Further, in step S3.2, the calculation formula of the resonance elimination resistance $R_0$ is as follows:

$$R_0 = \frac{\sqrt{3}\, U_s^2}{3kP_t}.$$

In the formula, $P_t$ is a rated power of the PT, and k is a voltage multiple of the excitation characteristic of the PT, which is generally 1.9.

Figure 6:
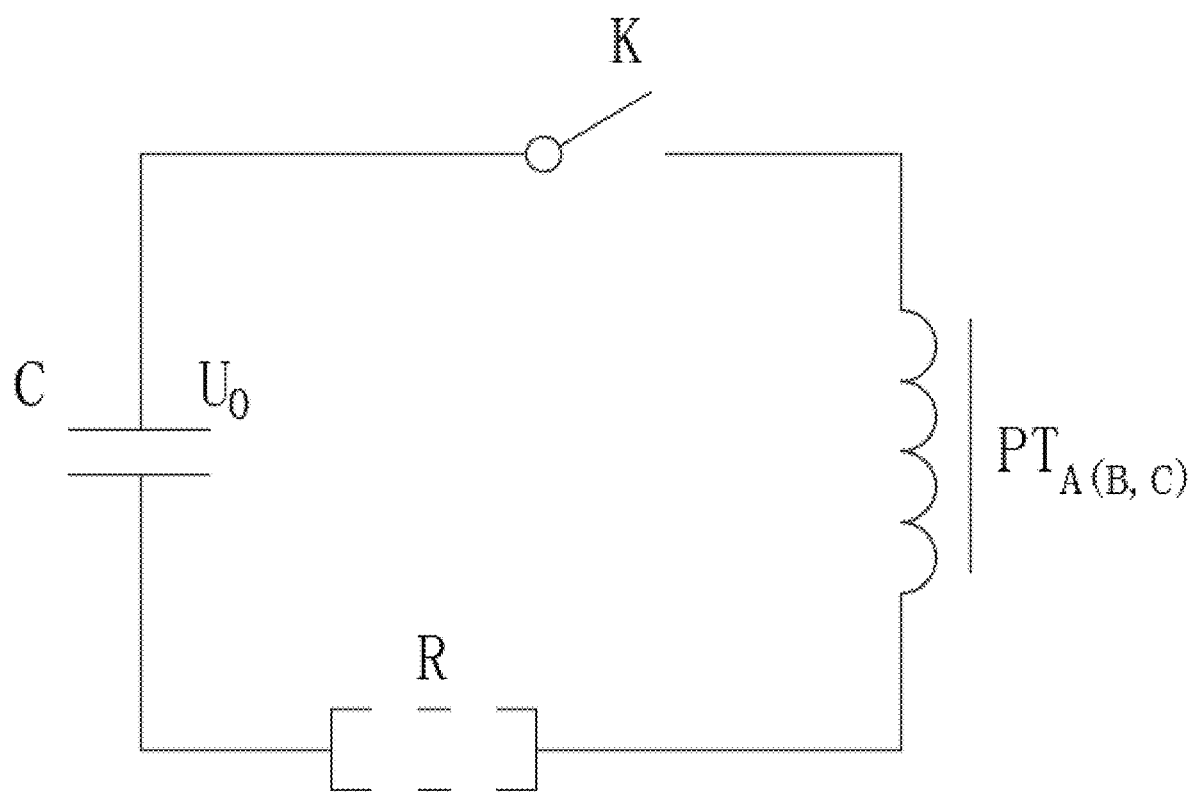
FIG. 6 is a schematic diagram of an exemplary PT ferromagnetic resonance excitation according to the present disclosure.
Figure 7:
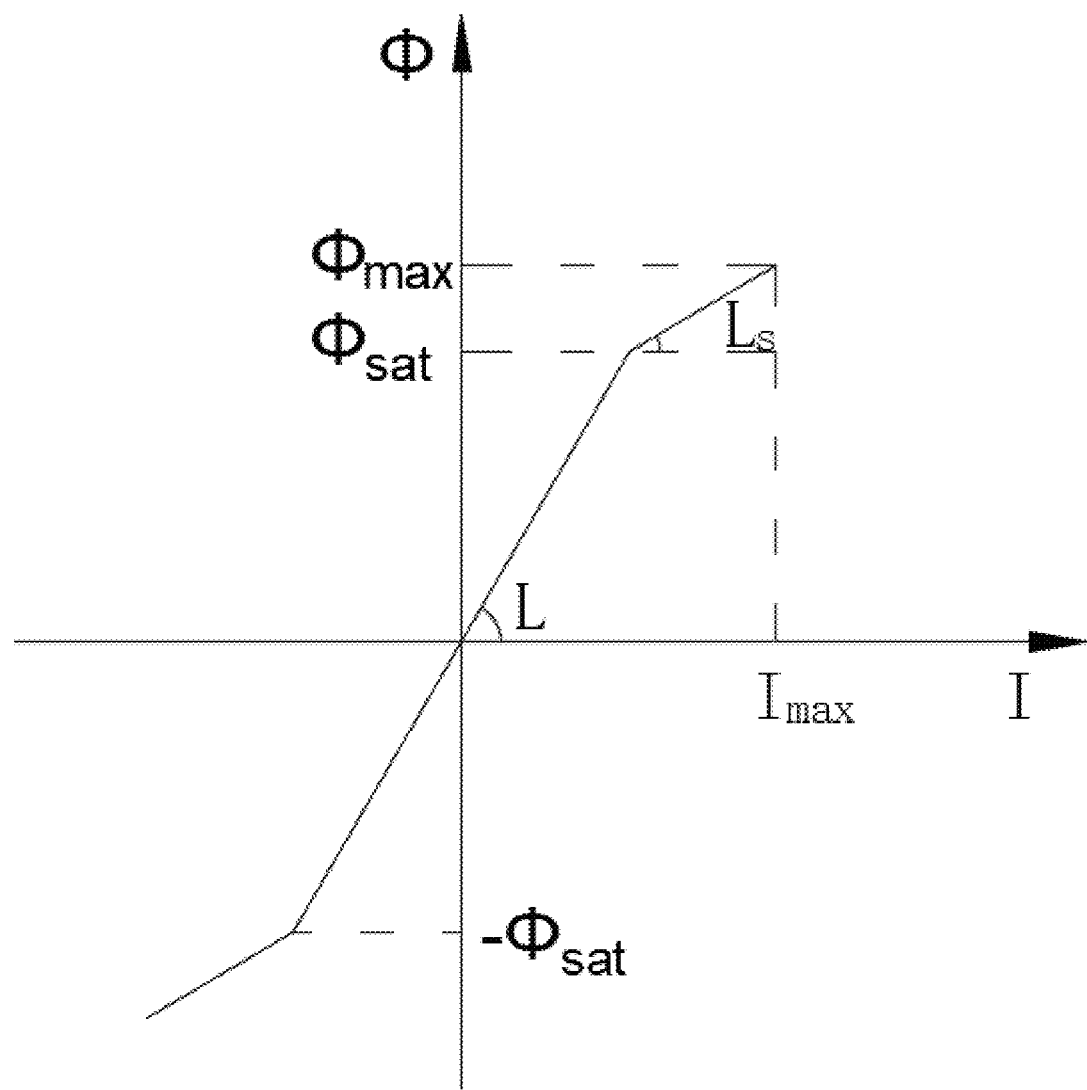
FIG. 7 is a schematic diagram of exemplary PT core characteristic changes according to the present disclosure.

In this embodiment, FIG. 6 is a schematic diagram of a PT ferromagnetic resonance excitation, in which capacitance and inductance are connected in series, and K in the figure represents the disappearance of the earth fault of the system, lightning stroke, or operations such as a closing operation; and FIG. 7 is a schematic diagram of PT core characteristic changes before and after the PT ferromagnetic resonance excitation.

In step S3.3, the changes in the PT core characteristics before and after undergoing the energy jump are as follows:

If $\omega_1$ is a harmonic angular frequency of a resonance point before the PT core characteristics undergo the energy jump, $\omega_2$ is a harmonic angular frequency of the resonance point after the PT core characteristics undergo the energy jump, and φ is a magnetic flux of the PT core, then:

$$\omega_1 = \frac{1}{\sqrt{LC}};$$
$$\omega_2 = \frac{1}{\sqrt{L_s C}};$$
$$\Phi = \frac{U_0}{\omega_1} \sin\omega_1 t;$$
$$U = U_0 \cos\omega_1 t.$$

In the formula, L is an inductance obtained before the PT core characteristics undergo the energy jump, $L_s$ is an inductance obtained after the PT core characteristics undergo the energy jump, C is a capacitance of the system, and U is a real-time voltage during the energy jump of the PT core characteristics, and t is a time point.

Figure 8:
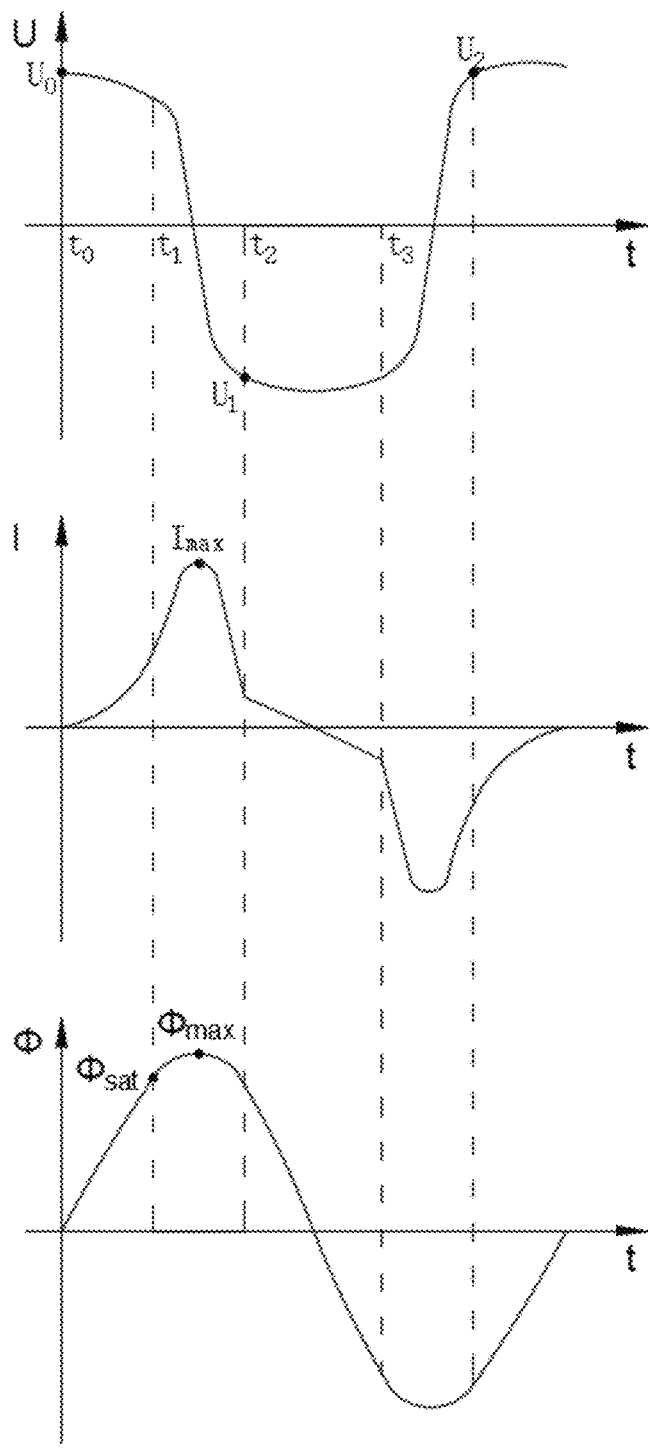
FIG. 8 is a diagram showing changes in voltage, current, and core characteristic saturation of a PT core in an exemplary resonance energy jump process according to the present disclosure.

Further, as shown in FIG. 8, when $$U_1 \approx U_2 \approx U_o, \text{ if } \frac{U_0}{\omega_1} > \Phi_{sat},$$

the core tends to be saturated at time $t_1$, and the inductance is L→$L_s$ at this time; and then in step S3.4, the electrostatic energy stored in the zero-sequence loop (capacitance) of the system is converted into the electromagnetic energy in the PT core.

Further, in step S3.5, the electromagnetic energy consumed in the rapid energy consumption process I is the electromagnetic energy in the PT core converted from the electrostatic energy stored in the zero-sequence loop (capacitance) of the system in step S3.4.

Then, before performing step S3.5, it is necessary to determine whether $\Delta U_{max}=\Delta_{max}\{U_a, U_b, U_c\}>5$ V (where, $\Delta U_{max}$ is the maximum voltage change difference); and if so, it is proceeded to the rapid energy consumption process 1, and the resistance ($R_{min}=4\Omega$) is input continuous for 40 ms.

Figure 9:
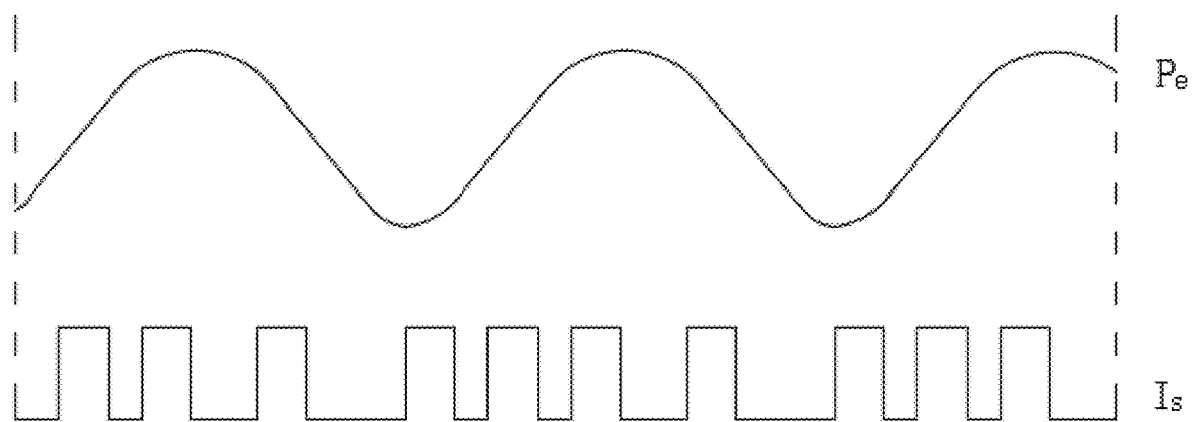
FIG. 9 is a diagram showing a relationship between a rated thermal load and an open (tertiary) winding current in an exemplary rapid energy consumption process II according to the present disclosure.

In this embodiment, as shown in FIG. 9, in the rapid energy consumption process II of step S3.6, the calculation method for inputting the initial resistance $R_{i0}$ is as follows:

$$R_{i0} = \frac{U_{max} \cdot U_s}{\sqrt{3} P_e}.$$

In the formula, $P_c$ is a rated thermal load of the PT.

Then, the basis for real-time dynamic adjustment of $R_i$ (the magnitude of the resistance input in real time) is as follows:

$$I_s \cdot U_s = P_e.$$

Through experiments, this solution overcomes a contradiction between a magnitude of resonance elimination resistance and winding overload in a PT open delta during single-phase-to-earth fault and fault clearance, and effectively avoids the technical problems of difficult distinguishing between single-phase-to-earth fault characteristics and power frequency resonance characteristics and causing resonance in a single-phase-to-earth fault process.

The main purpose of this solution is to ensure that the PT is not overloaded and burned out. Therefore, the active resonance elimination device mainly based on the electronic load is actually implemented by inputting the resistance with a corresponding magnitude under the premise that the PT (potential transformer) is not overloaded. Therefore, the PID process, on which the active resonance elimination device is based, often only needs to focus on the voltage and current on the open (tertiary) winding. Further, a more intelligent resonance elimination method can be adopted based on this, which is to use the rated power of the PT as a target value of PID to dynamically adjust the magnitude of input resistance, thereby adjusting the current of the open (tertiary) winding, so that the open (tertiary) winding is not overloaded, and the purpose of preventing the ferromagnetic resonance of the PT in an active manner can be achieved at the fastest speed.

Figure 12:
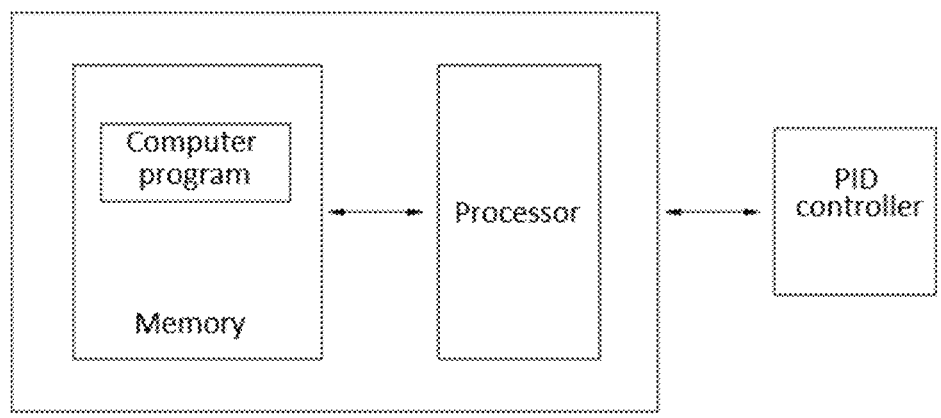
FIG. 12 is a structural diagram of an exemplary electronic computer platform device according to the present disclosure.

As shown in FIG. 12, this embodiment further provides a method for running a platform device, and the device includes a processor, a memory, and a computer program which is stored in the memory and runs on the processor.

The processor includes one or more processing cores. The processor is connected to the memory by means of a bus, and the memory is used to store program instructions. The processor is used to implement the steps of the PT ferromagnetic resonance elimination method implemented by actively inputting resistance through an electronic load when executing the program instructions in the memory.

Optionally, the memory can be implemented by any type of volatile or non-volatile storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

In addition, the present disclosure further provides a computer-readable storage medium, in which the computer program is stored. When the computer program is executed by the processor, the steps of the PT ferromagnetic resonance elimination method implemented by actively inputting resistance through an electronic load are implemented.

Optionally, the present disclosure also provides a computer program product containing instructions that, when running on a computer, causes the computer to perform the steps of the PT ferromagnetic resonance elimination method implemented by actively inputting resistance through an electronic load in various aspects mentioned above.

Those of ordinary skill in the art can understand that the process of implementing all or part of the steps of the above embodiments can be completed by means of hardware, or by instructing the relevant hardware via the program. The program can be stored in the computer-readable storage medium, which may be a read-only memory, a magnetic disk, an optical disk, or the like.

The basic principles, main features and advantages of the present disclosure have been shown and described above. Those skilled in the art should understand that the present disclosure is not limited by the above-mentioned embodiments, and those described in the above-mentioned embodiments and Description are only exemplary examples of the present disclosure, and are not intended to limit the present disclosure. Without departing from the spirit and scope of the present disclosure, there may be various changes and improvements to the present disclosure, which shall all fall within the protection scope of the present disclosure as claimed. The protection scope of the present disclosure is defined by the appended Claims and their equivalents.

What is claimed is:

1. A PT ferromagnetic resonance elimination method implemented by actively inputting resistance through an electronic load, comprising the following steps:

S1: setting up a PT comprising primary, secondary and open tertiary windings, and determining a mapping relationship between a secondary voltage and an open tertiary voltage;

S2: based on a resistance matching algorithm and a PID control strategy, constructing a resonance elimination control system and presetting a resistance active-matching strategy; and S3: designing an engineering solution of using the electronic load to replace a DC motor and a circular rheostat for inputting resistance as an active resonance elimination device, the specific operating principle of the active resonance elimination device comprising the following steps:

S3.1: accumulation of resonance energy: when in normal operation or when a three-phase load of the system is slightly unbalanced, not starting the active resonance elimination device;

S3.2: slow energy consumption process: when the three-phase load of the system is unbalanced, the system has earth fault, starting the active resonance elimination device, inputting the resonance elimination resistance $R_0$, and consuming electrostatic energy accumulated in a zero-sequence loop of the system;

S3.3: resonance energy jump resonance excitation: if PT resonance excitation is caused by the disappearance of the earth fault of the system, lightning stroke, or operations such as a closing operation, allowing PT core characteristics to undergo an energy jump;

S3.4: when a core tends to be saturated, converting the electrostatic energy stored in the zero-sequence loop capacitance of the system into electromagnetic energy in the PT core;

S3.5: rapid energy consumption process I: inputting the minimum resonance elimination resistance $R_{min}$ into the open tertiary winding to consume the electromagnetic energy; and S3.6: rapid energy consumption process II: after the completion of $R_{min}$ input for 40 ms, entering the rapid energy consumption process II, inputting the initial resistance $R_{i0}$ at this time, monitoring the current $I_s$ of the open tertiary winding, and adjusting a duty cycle of the $I_s$ by means of a metal oxide semiconductor field effect transistor (MOSFET) to achieve the real-time dynamic adjustment of $R_i$, the $R_i$ is a magnitude of resistance input in real time;

wherein according to the engineering solution of using the electronic load to replace the DC motor and the circular rheostat for inputting the resistance in step S3, the implementation principle of the electronic load is as follows:

the electronic load selects the initial resistance $R_{i0}$, the magnitude of which is the minimum when the resistance is put into operation;

further, the electronic load performs full-wave rectification and transformation on the $U_s$ of the open tertiary winding by means of a rectifier bridge, thus becoming a pulsating signal with only positive polarity, $U_s$ is an effective value of a port voltage of the open tertiary winding that can be directly measured from an opening; and after being input, the initial resistance $R_{i0}$ is modulated by the MOSFET controlled by a PWM signal of 50000 Hz, so that an equivalent matching resistance for resonance elimination is obtained; and in step S3.1, under the condition of $U_s=3U_o<7V$, the three-phase load of the system is slightly unbalanced, and the active resonance elimination device is not started, $U_o$ is an effective value of a neutral point-to-ground voltage, i.e., a zero-sequence voltage.

2. The PT ferromagnetic resonance elimination method implemented by actively inputting resistance through an electronic load according to claim 1, wherein in step S1, when the PT comprising the primary, secondary and open tertiary windings is set up, if it is first assumed that $U_a$, $U_b$, and $U_c$ are respectively effective values of a three-phase voltage at the side of the secondary winding of the PT under normal operation, $U_s$ is an effective value of a port voltage of the open tertiary winding that can be directly measured from an opening, $U_{da}$, $U_{db}$, and $U_{dc}$ are respectively effective values of the three-phase voltage at the side of the opening tertiary winding of the PT under normal operation, $U_o$ is an effective value of a neutral point-to-ground voltage, i.e., a zero-sequence voltage, and $U_s=U_{da}+U_{db}+U_{dc}=3U_o$; and then, the mapping relationship between the secondary voltage and the open tertiary voltage is as follows:

$U_a=\sqrt{3}U_{da}$, $U_b=\sqrt{3}U_{db}$, $U_c=\sqrt{3}U_{dc}$;

$U_{max}=\max\{U_a,U_b,U_c\}$;

$U_{dmax}=\max\{U_{da},U_{db},U_{dc}\}$;

$U_{max}=\sqrt{3}U_{dmax}$.

3. The PT ferromagnetic resonance elimination method implemented by actively inputting resistance through an electronic load according to claim 1, wherein in step S3.2, the calculation formula of the resonance elimination resistance $R_0$ is as follows:

$$R_0 = \frac{\sqrt{3}\,U_s^2}{3kP_t};$$

in the formula, $P_t$ is a rated power of the PT, and k is a voltage multiple of the excitation characteristic of the PT, which is generally 1.9.

4. The PT ferromagnetic resonance elimination method implemented by actively inputting resistance through an electronic load according to claim 3, wherein in step S3.3, the changes in the PT core characteristics before and after undergoing the energy jump are as follows:

if $\omega_1$ is a harmonic angular frequency of a resonance point before the PT core characteristics undergo the energy jump, $\omega_2$ is a harmonic angular frequency of the resonance point after the PT core characteristics undergo the energy jump, and $\varphi$ is a magnetic flux of the PT core, then:

$$\omega_1 = \frac{1}{\sqrt{LC}};$$

$$\omega_2 = \frac{1}{\sqrt{L_s C}};$$

$$\Phi = \frac{U_0}{\omega_1}\sin\omega_1 t;$$

$$U = U_0 \cos\omega_1 t;$$

in the formula, L is an inductance obtained before the PT core characteristics undergo the energy jump, $L_s$ is an inductance obtained after the PT core characteristics undergo the energy jump, C is a capacitance of the system, and U is a real-time voltage during the energy jump of the PT core characteristics, and t is a time point.

5. The PT ferromagnetic resonance elimination method implemented by actively inputting resistance through an electronic load according to claim 4, wherein in step S3.5, the electromagnetic energy consumed in the rapid energy consumption process I is the electromagnetic energy in the PT core converted from the electrostatic energy stored in the zero-sequence loop capacitance of the system in step S3.4.

6. The PT ferromagnetic resonance elimination method implemented by actively inputting resistance through an electronic load according to claim 2, wherein in the rapid energy consumption process II of step S3.6, the calculation method for inputting the initial resistance $R_{i0}$ is as follows:

$$R_{i0} = \frac{U_{max} \cdot U_s}{\sqrt{3} P_e};$$

in the formula, $P_c$ is a rated thermal load of the PT; and then, the basis for real-time dynamic adjustment of the magnitude of the resistance input in real time of $R_i$ is as follows:

$$I_s \cdot U_s = P_e.$$

* * * * *